S. J. HALL.
PISTON RING.
APPLICATION FILED JUNE 24, 1920.

1,360,939.

Patented Nov. 30, 1920.

Inventor:
Samuel J. Hall
by Chas. J. O'Neill
Atty.

UNITED STATES PATENT OFFICE.

SAMUEL J. HALL, OF JACKSONVILLE, TEXAS.

PISTON-RING.

1,360,939.

Specification of Letters Patent.

Patented Nov. 30, 1920.

Application filed June 24, 1920. Serial No. 391,260.

*To all whom it may concern:*

Be it known that I, SAMUEL J. HALL, a citizen of the United States, residing at Jacksonville, county of Cherokee, State of Texas, and whose post-office address is Jacksonville, Texas, have invented certain new and useful Improvements in Piston-Rings; and I do hereby declare the following to be a full, clear, and exact description of the invention, such as will enable others skilled in the art to which it appertains to make and use the same.

This invention relates to piston rings of the compound type, comprising two matched sections so constructed and assembled as to form a compact and efficient ring, capable of maintaining a tight fit within the cylinder and also in the piston ring groove formed in the piston.

The salient object of the invention is the provision of a piston ring, consisting of an outside section coöperating with what might be termed an inside section with beveled contact surfaces between the two sections, the inside section presenting a much narrower bearing surface contacting with the cylinder, than the bearing surface of the outside section, so that said inside section will wear more quickly than the outside section, which will allow for a radial expansion of said inside section, and by virtue of the beveled contact surfaces between said sections, will cause the inside section to move laterally with respect to the outside section and thereby maintain a tight fit and close contact with the cylinder and within the piston ring groove formed in the piston.

Another feature of the invention is the novel construction of the beveled contact surfaces between the ring sections, which will not only allow for the lateral expansion of the sections during the use of the ring but will prevent any circumferential movement of one section with respect to the other.

Another particular object is, that by reason of the peculiar structure of the beveled and flat surfaces the manufacture and finishing of the ring will be greatly facilitated, in a manner to be hereinafter more fully described.

Briefly considered the invention comprises a piston ring of the compound type, each section, for the purpose of description I will call the inside and outside sections, having formed on one side two beveled portions and two flat surfaces graduating into a single bevel portion and a single flat surface on its diametrically opposite side, the double bevel portion and double flat surface of one section being formed at the open side thereof and the other section having said double bevel portion and double flat surface formed on its closed side, so that when the two sections are assembled the open side of each section will be diametrically oppositely disposed in the customary manner. In forming the various bevels and flat portions during the manufacture of the ring the outside bevel is cut concentrically with the ring section, whereas the inner bevel is cut eccentrically with the ring section, so that the two beveled portions starting from one side of the ring will merge into a single bevel at the opposite side of the ring, as clearly shown in the drawings.

By reason of the construction of the various bevels and flat portions formed on the meeting surfaces of the two sections, the inside ring will not only be allowed to expand radially and transversely during the wearing of the ring but the two sections will be prevented from working around circumferentially. Another very important feature is that by reason of the flat surfaces the two sections may be firmly clamped together without wedging the inner section inside of the outside section, during the manufacturing and particularly the finishing of the ring as a whole, where it is necessary to so clamp and hold the ring during the finishing process.

Figure 2:
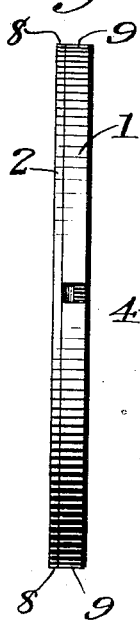
Fig. 2 is an end view thereof showing the narrow uniform wearing surface of the inner section and the wider wearing surface of the outer section.
Figure 1:
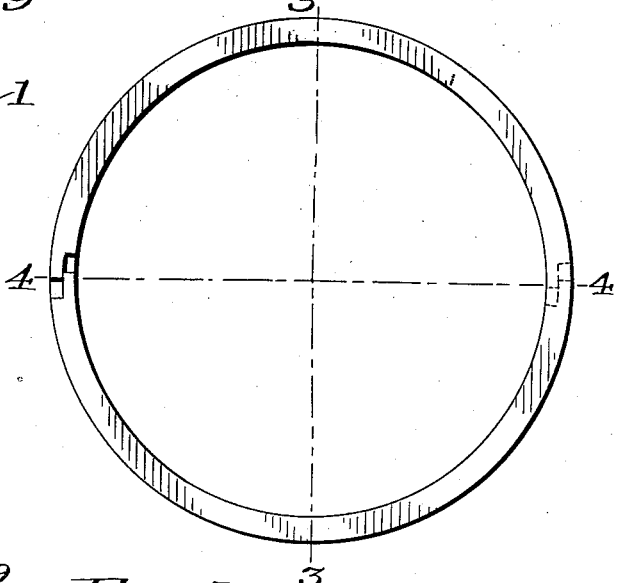
Figure 1 is a plan view of the ring with the two sections assembled.

Referring to the drawings in detail the invention comprises a two part piston ring, consisting of an outside section 1 and an inside section 2, both sections being split or divided in the customary manner. The inside meeting surface of the section 1 is provided with a concentrically cut bevel portion 3 and eccentrically cut bevel portion 4 with an intermediate flat portion 5 graduating into a single or common bevel portion 6, the double bevel portion being formed in one side of the section and the single bevel portion in the diametrically opposite side of the section, the whole section being provided with a main flat portion 7. The inside section 2 is likewise provided with complementary beveled and flattened surfaces $3^1$, $4^1$, $5^1$ and $6^1$, which are adapted to engage their corresponding beveled and flat portions of the main section 1 when the two sections are assembled. It will be noted that the inner edge $7^1$ of the section 2 firmly engages the main flat surface 7 of the section 1.

Figures 3, 4:
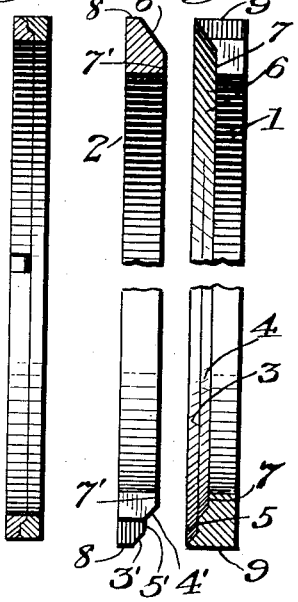
Fig. 3 is a sectional view on line 3—3 of Fig. 1.
Fig. 4 is an enlarged sectional view on line 4—4 of Fig. 1 with the two sections slightly spaced apart, showing the double bevel and flat surfaces formed in one side of the ring graduating into a single bevel and a single flat surface in the diametrically opposite side of the ring.
Figure 5:
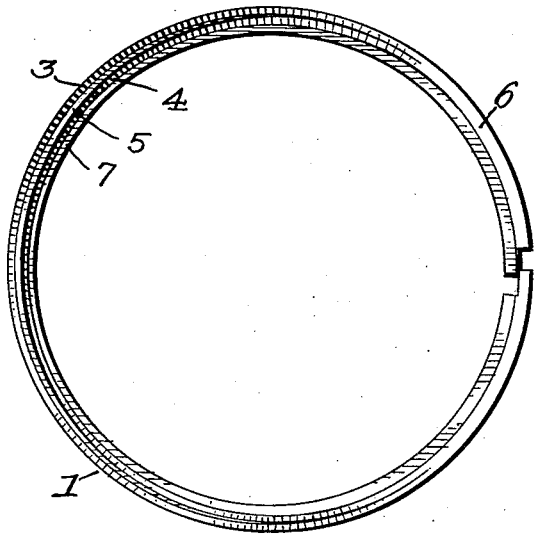
Fig. 5 is a plan view of the outside section showing the eccentrically and concentrically arranged beveled surfaces; and, Fig. 6 is a similar view of the inside section.
Figure 6:
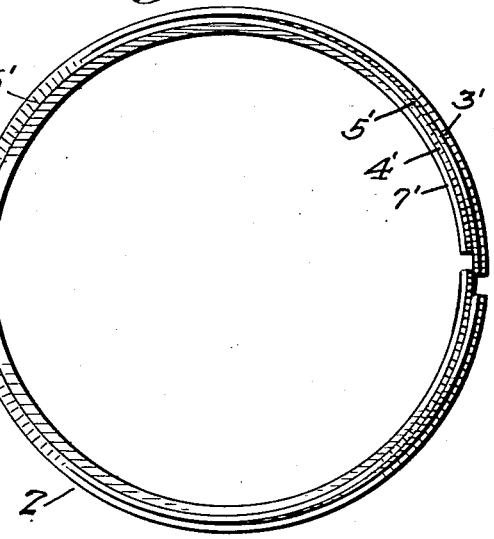

In cutting these various eccentric and concentric bevels and flat portions, it will be understood that in one section the double bevel and double flat surfaces will be formed in that portion of the ring opposite the split or open side thereof, whereas the complementary section will be provided with said bevels and flattened surfaces adjacent its open or split side so that when two sections are assembled the open side of each section will be oppositely disposed, as is the general practice. When so assembled the sections will be maintained in this relation, owing to the fact that the double bevel and flat surface of one section will only fit that part of the other section, likewise provided with double bevel and flat surfaces and correspondingly the single bevel and single flat surfaces of the opposite side will only fit the single bevel and single flat surfaces of its corresponding section. With this construction any shifting circumferentially of the sections is absolutely prevented as will be obvious upon referring to Fig. 4 of the drawings. At the same time the section 2 will be allowed to expand radially, and by reason of the beveled surfaces it will also be caused to expand transversely with respect to the ring as a whole. To produce this radial expansion of the section 2, rather than the section 1, the said section 2 is constructed with a bearing surface 8, which, it will be noted, is considerably narrower than the bearing surface 9 of the section 1, so that section 2 will obviously wear much more quickly than section 1, during the use of the ring. It will also be noted, that the width of the wearing surface 8 of the section 2, is substantially uniform around the entire circumference of this section, which will naturally result in a uniform wearing and expansion of this section 2.

The flat annular surface 7 of the section 1 is adapted to have firmly seated thereon the flat meeting edge $7^1$ of the section 2, so that section 2 cannot be forced or wedged within the section 1 as would be the case if the two sections were merely provided with the conventional beveled meeting surfaces. This is another very important feature, for the reason that with this construction the two sections can be positively positioned and firmly clamped together during the manufacturing of the ring and particularly the finishing thereof.

From the foregoing description it will be apparent that by the peculiar construction of the meeting surfaces of the two sections, of applicant's piston ring, three very important objects have been accomplished. The meeting surfaces of the two sections possess all of the advantages of a beveled contact surface permitting the inner section to expand radially and also transversely with respect to the ring, as a whole, during the wear of the ring, the two sections will also be prevented from shifting circumferentially, one section with respect to the other, and also the said sections may be firmly and securely clamped together without distorting or forcing one section inside of the other section, during the manufacture and finishing of said ring.

What I claim is:—

1. A compound piston ring comprising two split sections, each section provided at its meeting surface with two annular beveled portions and two flat portions at one side thereof, graduating into a single bevel and a single flat portion at its diametrically opposite side, one of said bevels being cut concentrically and the other eccentrically to the section.

2. A compound piston ring comprising two split sections, one fitting within the other, the inside section having an outside bearing surface of less width than the outside bearing surface of the outside section, the width of the bearing surfaces of each section being uniform around the entire circumference of the ring, and each section provided at its meeting surface with two annular bevel portions and two flat portions at one side thereof, graduating into a single bevel and a single flat portion at its diametrically opposite side, one of said bevels being cut concentrically and the other eccentrically to the ring.

3. A compound piston ring comprising two split sections, each section provided at its meeting surface with two annular beveled portions and two flat portions at one side, thereof, graduating into a single bevel and a single flat portion at its diametrically opposite side, one of said bevels being cut concentrically and the other eccentrically to the section, one section being provided with double bevel and double flat portions at its open side and the single bevel and single flat portions at its diametrically opposite closed side, to be assembled with the other section having its double and single bevels and flat portions oppositely arranged, whereby any tendency toward the circumferential working of the open side of one section with respect to the other is prevented.

In testimony whereof I affix my signature.

SAMUEL J. HALL.